2 Sheets—Sheet 1.

ANNA B. STAPLER.
TEA AND COFFEE URN.

No. 177,970. Patented May 30, 1876.

Witnesses.

Inventor
Anna B. Stapler
per
Atty

ANNA B. STAPLER.
TEA AND COFFEE URN.
No. 177,970. Patented May 30, 1876.
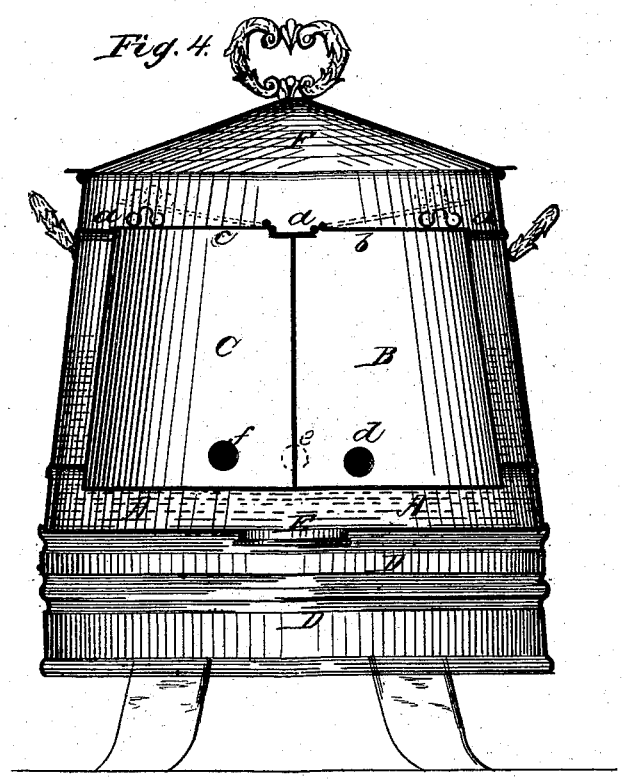
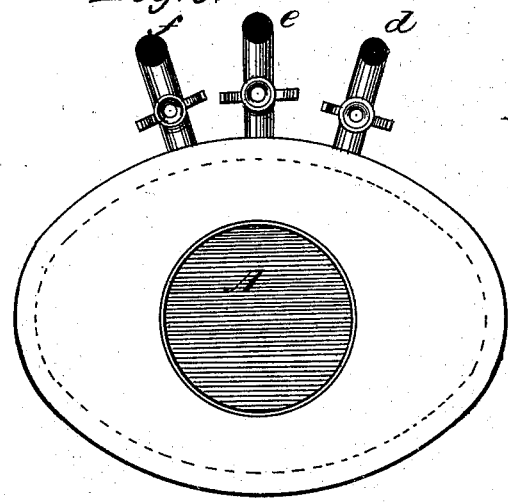
Witnesses
Inventor
Anna B. Stapler

UNITED STATES PATENT OFFICE.

ANNA B. STAPLER, OF WILMINGTON, DELAWARE.

IMPROVEMENT IN TEA AND COFFEE URNS.

Specification forming part of Letters Patent No. 177,970, dated May 30, 1876; application filed May 10, 1876.

*To all whom it may concern:*

Be it known that I, ANNA B. STAPLER, of Wilmington, in the county of New Castle and State of Delaware, have invented a new and useful Improvement in Combined Tea and Coffee Urns, which improvement is fully set forth in the following specification, reference being had to the accompanying drawings.

The object of my invention is, by a triple combination, to furnish a convenient means of holding tea, coffee, and hot water in the same vessel, while each fluid is kept distinct from the others in its respective compartment, thus obviating the necessity of separate vessels, thereby saving expense and room, and at the same time furnishing a commodious article of table-furniture.

Figure 1:
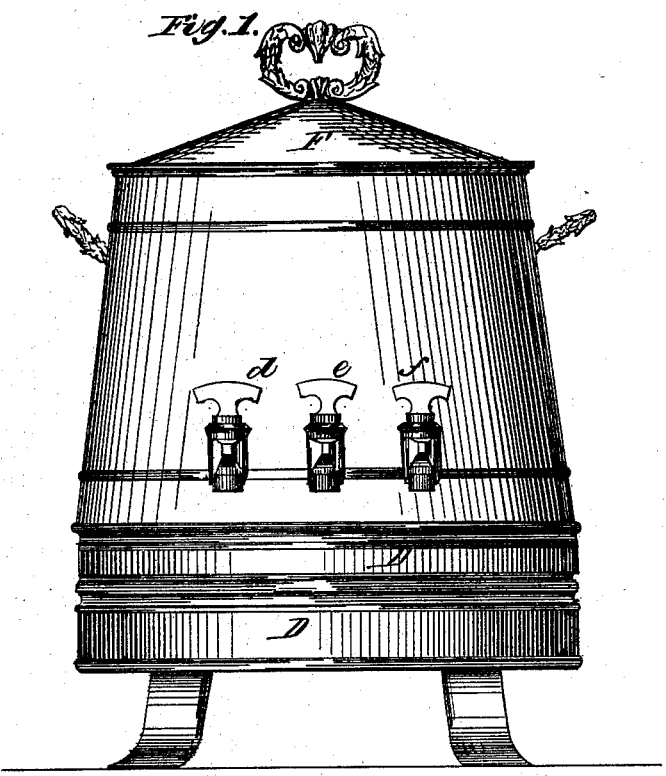
Figure 2:
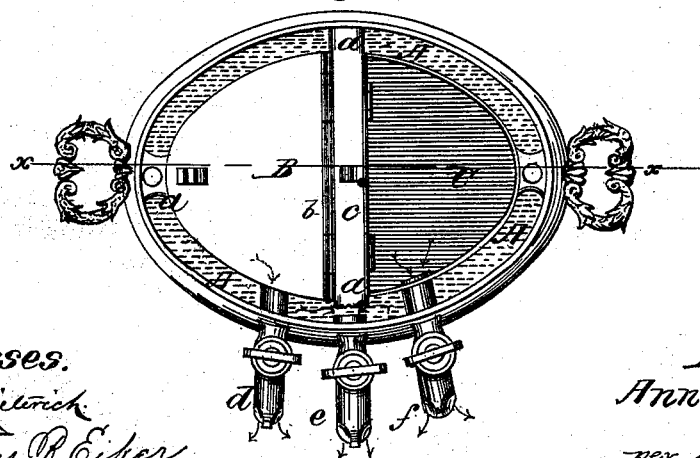

Figure 1 of the drawings is a front view of an apparatus embodying my invention on its stand and ready for use. Fig. 2 is a view of the top with the cover removed and one lid raised. Fig. 3 is a view of the bottom with the stopper removed. Fig. 4 is a sectional view through $x$ $x$ of Fig. 2. Fig. 5 is a detached view of the bottom hole and stopper.

Similar letters represent similar parts.

A represents a space or reservoir for hot water. B and C represent compartments for tea and coffee, or other beverage, and which compartments are rigidly held in place by bars $a$, there being a hot-water space between their bottoms and that of A—$b$ and $c$ showing the hinged lids for each of the interior compartments, and $d$, $e$, and $f$ being faucets. D shows the detachable base or stand on legs for supporting the urn. F is the cover of the urn.

The mode of operation of my apparatus may readily be understood; but to make it clear beyond the probability of misconception, I will now more particularly describe the several parts and their proper objects. The stopper E, which may be of any convenient diameter, is fastened into the bottom by a screw, and, when desirable, it may be removed—as, for example, when it is necessary to cleanse the interior of the water-reservoir A. The stopper E having been tightly screwed into place, reservoir A may be filled or partly filled with boiling water, and should be kept hot, which may be done by means of a flame or fire beneath the urn. The lids of the compartments B and C having been closed, the urn is covered and the whole ready for use. When the water in A is boiling, the fluids in B and C are kept nearly up to boiling heat, and, by reason of the lids $b$ and $c$ being tightly closed, the aroma is retained, the force of the steam in B and C not being great enough to lift their lids.

My above-described apparatus may be constructed of tinned iron, copper, silver, or other suitable metal.

What I claim as my invention, and desire to secure by Letters Patent, is—

In a combined tea and coffee urn, the inclosed water-space A, having a hole in its lower part, with the stopper E, the compartments B and C, with hinged lids $b$ and $c$, the faucets $d$, $e$, and $f$, one of which connects with A, and each of the others with B or C, and all constructed and operating substantially as described.

ANNA B. STAPLER.

Witnesses:
S. A. TERRY,
D. W. HOWARD.